(12) United States Patent
Fisher

(10) Patent No.: US 8,801,835 B1
(45) Date of Patent: Aug. 12, 2014

(54) REDUCING LOSS RATES OF GLYCEROL ASSOCIATED WITH DEHYDRATION OF CARBON DIOXIDE

(75) Inventor: Kevin S. Fisher, New Braunfels, TX (US)

(73) Assignee: Denbury Onshore, LLC, Plano, TX (US)

( * ) Notice: Subject to any disclaimer, the term of this patent is extended or adjusted under 35 U.S.C. 154(b) by 336 days.

(21) Appl. No.: 13/182,061

(22) Filed: Jul. 13, 2011

(51) Int. Cl.
*B01D 53/14* (2006.01)

(52) U.S. Cl.
USPC .................. 95/178; 95/179; 95/193; 95/209; 95/231

(58) Field of Classification Search
None
See application file for complete search history.

(56) References Cited

U.S. PATENT DOCUMENTS

| | | | | | |
|---|---|---|---|---|---|
| 4,500,333 | A | * | 2/1985 | Blytas | 62/633 |
| 4,784,673 | A | * | 11/1988 | Blytas et al. | 95/231 |
| 5,766,423 | A | * | 6/1998 | Smith | 203/12 |

* cited by examiner

*Primary Examiner* — Duane Smith
*Assistant Examiner* — Pankti Patel
(74) *Attorney, Agent, or Firm* — Fish & Richardson P.C.

(57) ABSTRACT

In some implementations, a method for dehydrating carbon dioxide includes identifying a stream including at least carbon dioxide and water. At least a portion of the stream is dehydrated using an initial lean sorbent including glycerol and a polyhydric alcohol to generate dry carbon dioxide stream and rich sorbent including water. The polyhydric alcohol reduces an amount of glycerol lost to the dry carbon dioxide stream during dehydration. This process may result in the beneficial reduction in the amount of glycerol that leaves the system with the dry carbon dioxide. The dry carbon dioxide and the rich sorbent are separated. The glycerol is recycled by dehydrating the rich sorbent to produce recycled lean sorbent.

9 Claims, 5 Drawing Sheets

REDUCING LOSS RATES OF GLYCEROL ASSOCIATED WITH DEHYDRATION OF CARBON DIOXIDE

TECHNICAL FIELD

This invention relates to reducing loss rates of glycerol associated with dehydration of carbon dioxide.

BACKGROUND

Supercritical carbon dioxide refers to carbon dioxide that is in a fluid state while also being at or above both its critical temperature and pressure, yielding rather uncommon properties. Carbon dioxide usually behaves as a gas in air under ordinary or ambient conditions or as a solid called dry ice when frozen. If the temperature and pressure are both increased from ordinary or ambient conditions to be at or above the critical point for carbon dioxide, it can adopt properties midway between a gas and a liquid. More specifically, it behaves as a supercritical fluid above its critical temperature (31.1° C.) and critical pressure (72.9 atm/7.39 MPa), expanding to fill its container like a gas but with a density like that of a liquid. Supercritical $CO_2$ is becoming an important commercial and industrial solvent due to its role in chemical extraction and utility in enhanced oil recovery in addition to its low toxicity and environmental impact.

SUMMARY

In some implementations, a method for dehydrating carbon dioxide includes identifying a stream including at least carbon dioxide and water. At least a portion of the stream is dehydrated using an initial lean sorbent including glycerol and a polyhydric alcohol to generate dry carbon dioxide stream and rich sorbent including water. The polyhydric alcohol reduces an amount of glycerol lost to the dry carbon dioxide stream during dehydration. This process may result in the beneficial reduction in the amount of glycerol that leaves the system with the dry carbon dioxide. The dry carbon dioxide and the rich sorbent are separated. The glycerol is recycled by dehydrating the rich sorbent to produce recycled lean sorbent.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
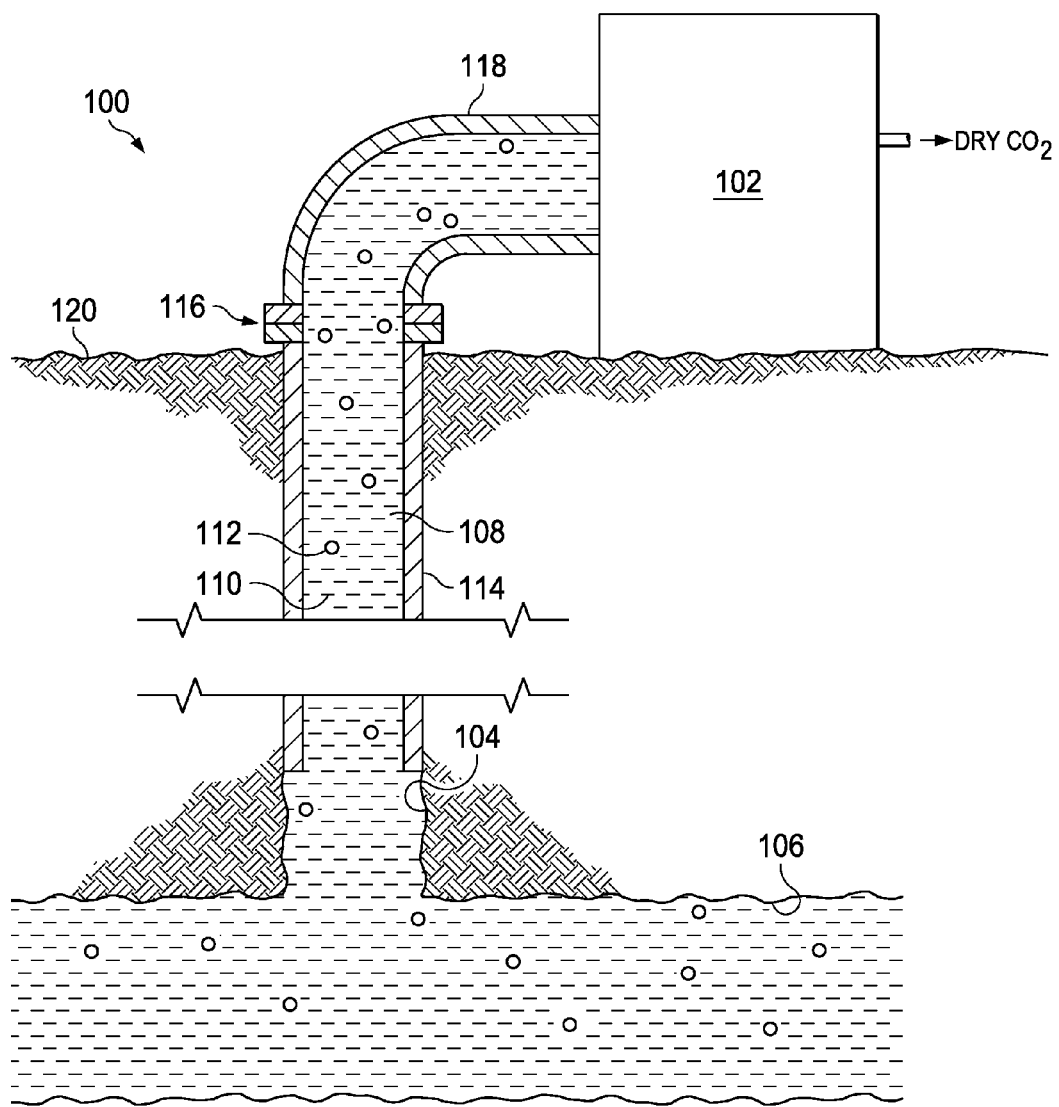
FIG. 1 is a system in accordance with some implementations of the present disclosure.

FIG. 1 illustrates a system 100 for reducing loss of glycerol during dehydration processes using one or more additives. For example, the system 100 may substantially prevent loss of liquid glycerol desiccant when dehydrating supercritical or near supercritical carbon dioxide ($CO_2$) using at least one polyhydric alcohol additive (e.g., sorbitol). The system 100 may contact wet $CO_2$ with glycerol, which absorbs the water, while substantially preventing loss of the glycerol in the dehydration process by using an additive. In other words, the system 100 may recycle glycerol when dehydrating wet $CO_2$, such as supercritical CO2 from a subterranean formation, by combining an additive with the glycerol. While the following description indicates the source of wet $CO_2$ as a subterranean formation, the system 100 may receive wet $CO_2$ from any number of sources such as a subterranean formation, a refinery, fertilization manufacturer, $CO_2$ capture systems, and/or other sources. Substantially preventing loss using an additive may include reducing loss of glycerol by about 20%, 30%, 40%, 50%, 60%, or greater as compared with solely using glycerol to dehydrate wet $CO_2$. Polyhydric alcohol additives may include sorbitol, erythritol, pentaerythritol, xylitol, and/or others. In some implementations, the polyhydric alcohol may reduce solubility of the glycerol by reducing its activity in the liquid sorbent. In general, supercritical $CO_2$ refers to carbon dioxide that is in a fluid state while also being at or above both its critical temperature and pressure. In other words, $CO_2$ may adopt properties both resembling gas and a liquid at critical temperature (31.1° C.) and critical pressure (72.9 atm/7.39 MPa). As mentioned, water may be removed from moist supercritical $CO_2$ by contacting the fluid $CO_2$ with glycerol. By drying supercritical $CO_2$, the system 100 may provide, for example, an injection fluid for tertiary oil recovery that eliminates, minimizes or otherwise reduces corrosion during the transport and utilization of supercritical $CO_2$. By combining an additive with the glycerol, the system 100 may eliminate, minimize or otherwise reduce the loss of the desiccant or glycerol and cost associated with using supercritical $CO_2$ or near supercritical $CO_2$ in tertiary recovery of resources.

In the illustrated implementation, the system 100 includes a dehydration system 102 communicatively coupled to wellbore 104 and subterranean formation 106 through the tubing 118. The dehydration system 102 receives fluid 108 including $CO_2$ 110 and water 112 and generates dry $CO_2$ by dehydrating the fluid 108 using a sorbent. In the illustrated implementation, the subterranean formation 106 including moist $CO_2$ (e.g., supercritical $CO_2$) and may include multiple zones. Turning to a more detailed description of system 100, the dehydration system 102 can include any software, hardware, and/or firmware configured to generate dry $CO_2$ by dehydrating the fluid 108. For example, the dehydration system 102 may include an absorber that enables the fluid 108 to contact a sorbent to generate a substantially dry stream of $CO_2$. In general, the dehydration system 102 may execute one or more of the following: receive the fluid 108 from the subterranean formation 106 through the tubing 118; contact the fluid 108 with a sorbent; separate the dry $CO_2$ from the sorbent; pass the sorbent including the water or rich sorbent to separating unit; heat the rich sorbent to evaporate the water while the sorbent substantially remains a liquid; separate the evaporated water; recycle the lean sorbent in the absorption process; and/or others. As previously mentioned, the fluid 108 may include supercritical $CO_2$, which is commonly produced from subterranean reservoirs near or above its critical point conditions of temperature and pressure of 87.9° F. and 1071 psia. These types of pressures may push the including $CO_2$ 110 as well as the rest of the fluid through the wellbore 104 and the tubing 118 to the dehydration system 102. As for contacting the fluid 108 with the sorbent, the dehydration system 102 may contact the supercritical fluid $CO_2$ near or above its critical point of temperature and pressure with the sorbent. In some implementations, the dehydration system 102 may include a plurality of trays, structured packing, and/or random packing with one or more different zones that hold the sorbent and provide a contacting area for the fluid 108.

As previously mentioned, the sorbent may include glycerol and one or more additives configured to reduce the loss of the glycerol during the dehydration process. For example, the one or more additives may reduce the loss of the glycerol by 50% or greater as compared without dehydration the fluid 108 without using the one or more additives. In addition, the glycerol may substantially maintain an ability to dehydrate the fluid 108. In general, the at least one additive can reduce the activity of the glycerol during dehydration and, in doing so, can reduce the loss of glycerol. In some implementations, the additive may be at least one polyhydric alcohol, polymer, and/or ionic compound. The polyhydric alcohol may include one or more of the following:

TABLE 1

| | Formula/Structure | Mol Wt | Melting Point, F. | Boiling Point, F. |
|---|---|---|---|---|
| Erythritol | H—(CHOH)$_4$—H | 122 | 250 | 624 |
| Pentitols (ribitol, xylitol) | H—(CHOH)$_5$—H | 152 | 142 | 419 |
| Hexitols (sorbitol, mannitol, dulcitol) | H—(CHOH)$_6$—H | 182 | 230 | 563 |
| Heptitol (e.g., Perseitol Volemitol) | H—(CHOH)$_7$—H | 212 | 370 | Not Avail. |
| Other examples related polyhydric alcohols | | | | |
| 1,2,3 Butane Triol | H—(CHOH)$_3$—CH$_3$ | 106 | 338 | Not Avail. |
| 1,2,4 Butane Triol | H—(CHOH)$_2$—CH$_2$—(CHOH)—H | 106 | 342 | Not Avail. |
| Pentaerythritol | C—(CH$_2$OH)$_4$ | 132 | 516 | Not Avail. |
| Pentane diols (amylene glycols) | HO—(CH$_2$)$_5$—OH | 104 | −0.4 | 500 |

The above table is for illustration purposes only but the dehydration system 102 may use some, all or none of the polyhydric alcohols without departing from the scope of the disclosure. In some implementations, the at least one additive may be about 20%, 30%, 40%, 50%, 60%, or 75%, by weight of the total lean sorbent. In addition, the at least one additive may reduce the loss rate of the glycerol by 20%, 30%, 40%, 50%, 60%, or 75% while substantially maintaining the efficacy of the glycerol during dehydration.

After removing water from the fluid 108, the rich sorbent is removed from the contacting area such as the trays, structured packing, and/or random packing and dehydrated using one or more processes such as evaporation. In some implementations, the $CO_2$ 110 can be dehydrated near or above its critical point or substantially in its supercritical form, which is near or above the critical point of temperature and pressure. For example, the $CO_2$ 110 may be dehydrated at from about 60 to 200° F., and a pressures from about 300 to 3,000 psig. In some implementations, the $CO_2$ 110 may be dehydrated at 100-130° F. and 1,200 to 2,200 psig. For example, the sorbent may include a concentration of sorbitol from about 5 to 75% based on the total weight of the composition. In some implementations, the sorbent may include a concentration of sorbitol from about 20 to 40% based on the total weight of the composition. As for recycling the sorbent, the dehydration system 102 may separate water from the rich sorbent using chemical and/or physical processes such as condensation, evaporation, diffusion, and/or others. For example, the dehydration system 102 may include still column and/or other methods.

The wellbore 104 extends from a surface 120 to the subterranean formation 106. The wellbore 104 may include a wellhead 116 that is disposed proximate to the surface 120. The wellhead 116 may be coupled to a tubing string 114 that extends a substantial portion of the length of the wellbore 104 from about the surface 120 towards the subterranean formation 106 (e.g., moist $CO_2$ reservoir). The tubing string 114 may extend to proximate a terminus 122 of the wellbore 104. In some implementations, the wellbore 104 may be completed with the tubing string 114 extending to a predetermined depth to the subterranean formation 106 and then extending substantially horizontally through the subterranean formation 106. In some implementations, the wellbore 104 may include other portions that are horizontal, slanted or otherwise deviated from vertical.

A land-based rig may have been previously drilled within the subterranean formation 106 to access one or more resources (e.g., a oil). For example, the subterranean formation 106 may have included or includes $CO_2$ 110, oil and gas, water, hydrocarbons and/or other fluids, including gases. In some implementations, the entrained $CO_2$ 110 may have been injected into the subterranean formation 106 during tertiary oil recovery or otherwise introduced or stored in the subterranean formation 106. The formation 106 may, for example, be a thin formation having a thickness of less than ten feet, and may include inconsistent bedding planes, or be undulating or faulted. In the illustrated implementation, the system 100 includes the wellhead 116 connected to the well bore 104 that extends from a surface 120 into the subterranean formation 106. In some implementations, the subterranean formation 106 can include a well bore pattern, which may include portions that deviate from vertical, such as slanting, sloping and/or radiused. In other instances, the well pattern may be substantially vertical. The well bore 104 is illustrated substantially vertical; however, well bore 104 may be formed at any suitable angle relative to surface 120 to accommodate surface 120 geometric characteristics or attitudes and/or the geometric configuration or attitude of subterranean formation 106.

Figure 2:
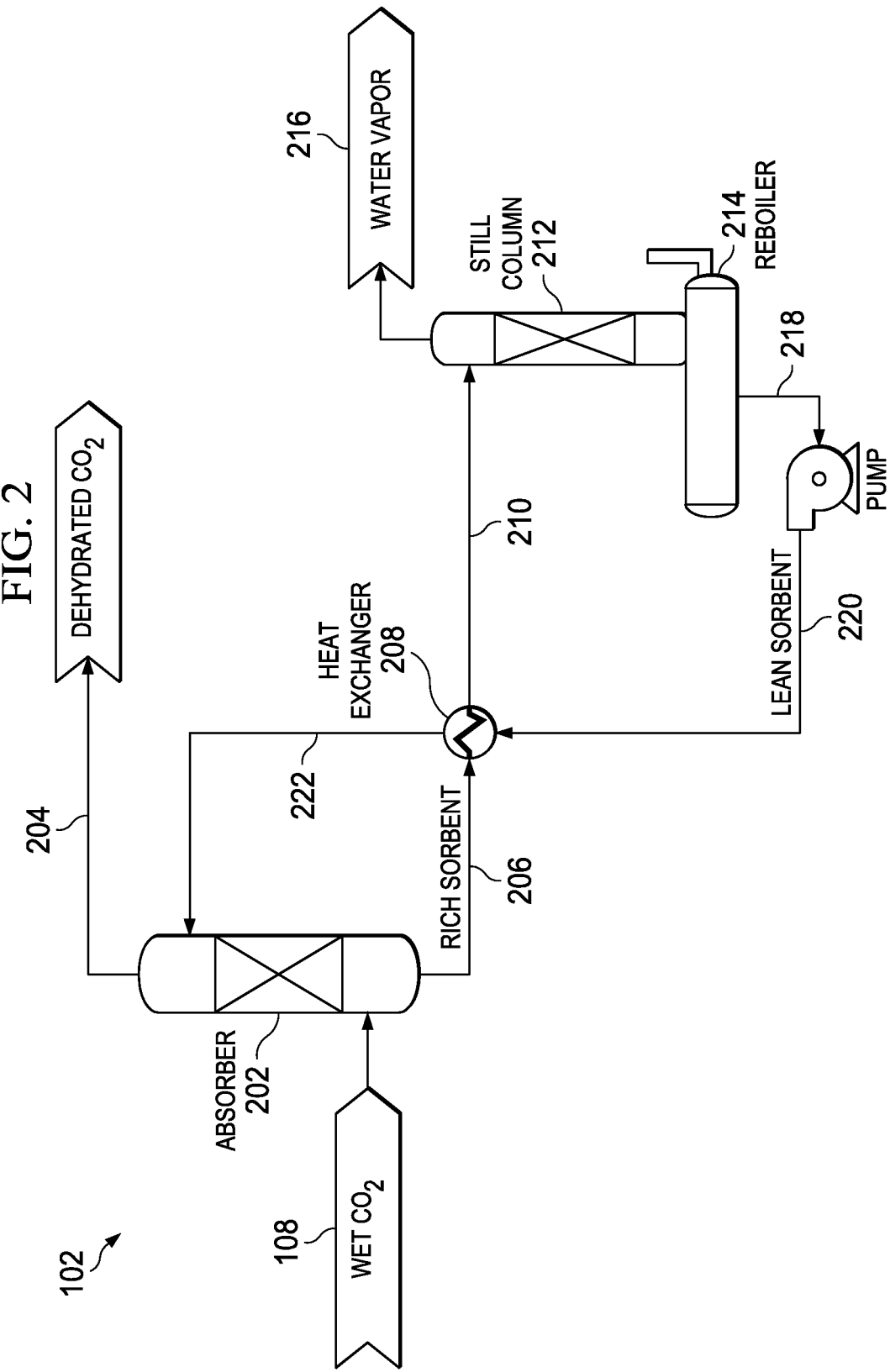
FIG. 2 illustrates an example dehydration system of FIG. 1.

FIG. 2 illustrates an example dehydration system 102 of FIG. 1 in accordance with some implementations of the present disclosure. Wet $CO_2$ 108 from, for example, a well is passed to the base of an absorber 202, and a lean sorbent 222 may be passed to the top of the absorber 202. Prior entering the absorber, the wet $CO_2$ 108 may be passed through one or more additional inlet scrubbers that may be a separator system integrated with the absorber or a separate vessel. Regardless, absorber 202 removes water vapor from the wet $CO_2$ 108 by dehydration. As previously mentioned, the absorber 202 may include a sorbent, such as glycerol and an additive (e.g., Sorbitol), to remove the water vapor from the fluid 108. The additive that reduces loss of the glycerol may include polyhydric alcohols as discussed above. In the absorber 202, the fluid 108 flows or otherwise moves upward through, for example, a randomly packed bed, structured packing, or a series of bubble cap, valve, or sieve trays filled with sorbent where the fluid 108 contacts the sorbent 222. The dry $CO_2$ 204 exits at least near the top of the absorber 204. Lean sorbent (e.g., glycerol plus an additive) may continuously be pumped into the absorber 202 at least near the top. As the sorbent moves downward, it absorbs water vapor from the rising fluid 108. The water-rich sorbent may be removed at the bottom of the absorber 202, which is indicated as rich sorbent 206.

A heat exchanger 208 may transfer heat from the lean sorbent 220 to the rich sorbent 206 to cool the lean sorbent coming from the reboiler 214 after regeneration and preheats the rich sorbent which is going to a still column 212 and the reboiler 214. The heat exchanger 208 may be an external unit, as illustrated, or located elsewhere such as a coil at the top of the absorber 202 without departing from the scope of this disclosure. After passing through the exchanger 208, the rich sorbent may be passed through a filter (not illustrated) to remove solids and/or other impurities. The rich sorbent is then passed through the top of the still column 212 to the reboiler 214. The reboiler 214 heats the rich sorbent 210 to above the boiling point of water to separate the glycerol and the water by simple distillation. The reboiler 214 may use combustion, hot oil or other liquid head medium, electricity, or steam as a heat source. On top of the reboiler, and in communication therewith, is the still column 212. Liquid vapor will rise from the reboiler 214 through the still column 212. Glycerol vapors which condense will drop back down into the reboiler 214 and be heated. The water vapor will through the still column 212 and exit as water vapor 216.

Figure 3:
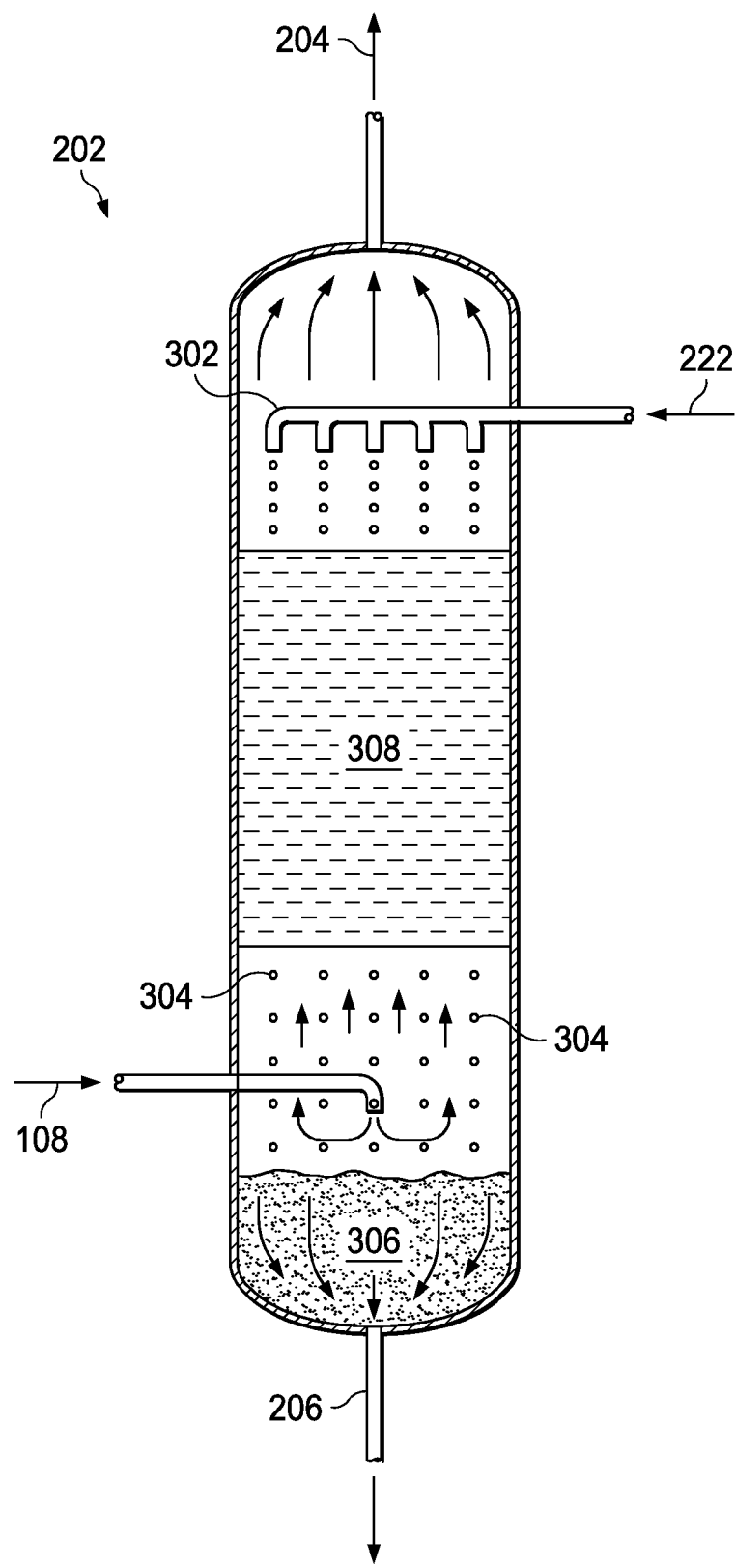
FIG. 3 illustrates an example absorber of FIG. 2.

FIG. 3 illustrates an example absorber 202 of FIG. 2 in accordance with some implementations of the present disclosure. In this implementation, the absorber 202 includes an inlet for the fluid 108 proximate the bottom, and the fluid 108 flows in an upward direction. Lean sorbent 222, including the glycerol and the additive, enters the absorber proximate the top of the absorber 202 and cascades or otherwise flows downward in substantially the opposite direction as the fluid 108. In some implementations, the flow of the lean sorbent 222 may be configured to have a large contact area. Regardless, the flowing sorbent 304 contacts the fluid 108 and absorbs and removes water from the fluid 108. The resulting dry $CO_2$ 204 exits the absorber from the top, and the rich sorbent 306 collects at the bottom of the absorber 306. The rich sorbent 206 is passed to a dehydration system to remove the water and recycle the glycerol as the lean sorbent 222. In the illustrated implementation, the fluid 108 flows through the element 308 which can be random packing, structured packing, and/or trays.

Figure 4:
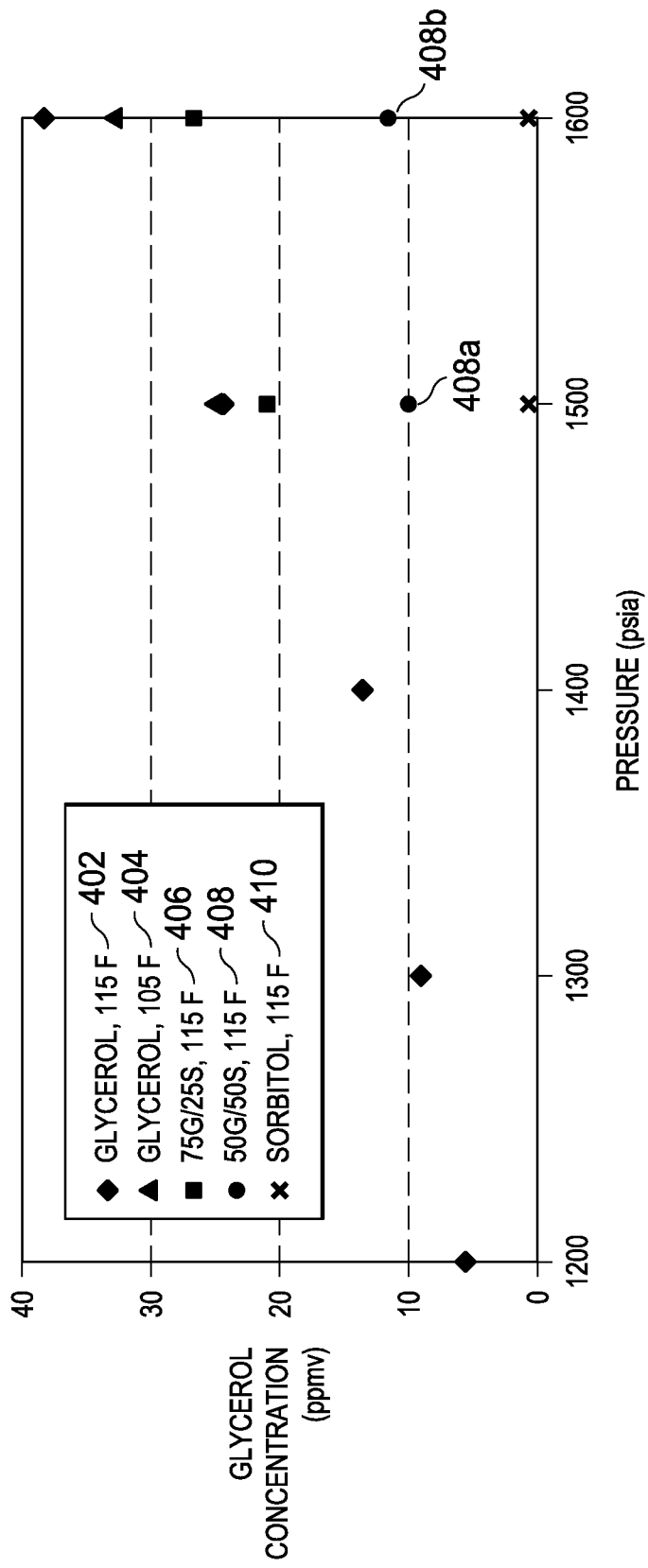
FIG. 4 illustrates an example graph for different sorbents.

FIG. 4 illustrates a graph 400 indicating solubility of glycerol, Sorbitol, and a mixture of glycerol and Sorbitol. In particular, the data points 410 indicate that sorbitol by itself (just sorbitol+water) has substantially no solubility in the $CO_2$. In addition, the data points 408 illustrate that a combination of 50 wt % sorbitol and 50 wt % glycerol reduces solubility of the glycerol by about 58% as compared to pure glycerol. In other words, for 50/50 (by weight) glycerol/sorbitol solutions at 1500 psig and 115 F, the glycerol concentration estimated from TOC analysis was approximately 10.2 ppmv as illustrated by data point 408a, which is a 58% reduction compared to a pure glycerol solution. At 1600 psig and 115 F, the glycerol concentration estimated from TOC analysis was approximately 11.5 ppmv as illustrated by data point 408b, which is a 58% reduction compared to a pure glycerol solution. The molar concentration of sorbitol in these solutions is 33%; these results suggest that a glycerol activity coefficient reduction may be occurring. The illustrated ratio of glycerol to sorbitol is for illustration purposes and dehydration systems may use other ratios without departing from the scope of the disclosure. For example, 75 wt % sorbitol (balance water) experiments were performed at 1500 psig, 115 F and 1600 psig, 115 F. TOC analysis from these experiments indicated no sorbitol present in the $CO_2$; measured levels were similar to baseline concentrations from the prior blank run. These tests confirm that sorbitol has negligible solubility in supercritical $CO_2$.

Figure 5:
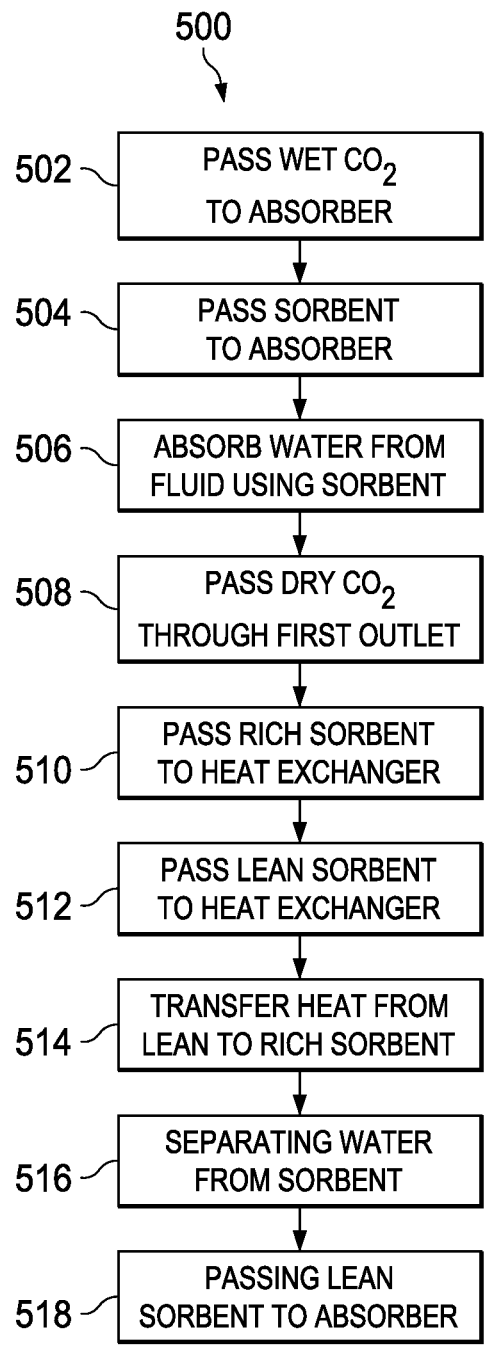
FIG. 5 is a flow chart illustrating an example method for recycling glycerol.

FIG. 5 is a flow chart 500 illustrating an example method for recycling glycerol when dehydrating $CO_2$. The illustrated methods are described with respect to the system 100 of FIG. 1, but these methods could be used by any other system. Moreover, the system 100 may use any other techniques for performing these tasks. Thus, many of the steps in these flowcharts may take place simultaneously and/or in different order than as shown. The system 100 may also use methods with additional steps, fewer steps, and/or different steps, so long as the methods remain appropriate.

Method 500 begins at step 502 where wet $CO_2$ is passed to an absorber. For example, supercritical or near supercritical $CO_2$ may be passed from a subterranean formation 106 to the absorber 202 illustrated in FIG. 2. Next, at step 504, lean sorbent is passed to the absorber at step 504. In the example, the reboiler 214 may pass recycled sorbent 222 to the absorber 202 after dehydration. At step 506, water from the wet $CO_2$ is absorbed by the sorbent by direct contact. Again in the example, the wet $CO_2$ 108 flows upward while the sorbent 222 flows downward, and, during contact, the sorbent 222 absorbs the water. The dry $CO_2$ is passed through a first outlet at step 508. As for the example, the dehydrated $CO_2$ 204 is passed through an outlet proximate the top of the absorber 202. At step 510, the rich sorbent is passed to a heat exchanger. Returning to the example, the rich sorbent 206 is passed through an outlet at least proximate the bottom of the absorber 202 and to the heat exchanger 208. Next, at step 512, lean sorbent is passed to the heat exchanger. Again in the example, the lean sorbent 220 is passed from the reboiler 214 to the heat exchanger 208. Heat is transferred from the lean sorbent to the rich sorbent prior to entering a dehydration unit at step 514. As for the example, the lean sorbent 220 is cooled prior to entering the absorber 202, and the rich sorbent is heated prior to entering the still column 212. At step 516, water is separated from the sorbent. In the example, the reboiler 214 heats the rich sorbent 210 to above the boiling point of water (e.g., 340° F.), and evaporated sorbent may condense in the still column 212 while water vapor 216 exits an outlet at least proximate the top of the still column 212.

A number of embodiments of the invention have been described. Nevertheless, it will be understood that various modifications may be made without departing from the spirit and scope of the invention. Accordingly, other embodiments are within the scope of the following claims.

What is claimed is:

1. A method for dehydrating carbon dioxide, comprising:
identifying a stream including at least supercritical carbon dioxide and water;
dehydrating at least a portion of the stream with an initial lean sorbent including glycerol and a polyhydric alcohol to generate a dry carbon dioxide stream and a rich sorbent including water;
using the polyhydric alcohol to reduce an amount of glycerol lost to the dry carbon dioxide stream during dehydration;
separating the dry carbon dioxide and the rich sorbent; and
recycling the glycerol by dehydrating the rich sorbent to produce recycled lean sorbent.

2. The method of claim 1, wherein dehydrating at least a portion of the stream comprises:
dispersing the stream in a first direction;
dispersing the lean sorbent in a second direction different from the first direction; and
contacting the dispersed stream with the dispersed lean sorbent.

3. The method of claim 1, further comprising transferring heat from the recycled lean sorbent to the rich sorbent.

4. The method of claim 1, wherein recycling the glycerol comprises:

substantially separating the water from the glycerol and the polyhydric alcohol by heating the rich sorbent to at least a boiling point of water; and passing the recycled lean sorbent to one or more positions to contact the stream.

5. The method of claim 1, wherein the polyhydric alcohol reduces loss of the glycerol during dehydration by about 10% or greater.

6. The method of claim 1, wherein the lean sorbent comprises at least 20% by weight of the polyhydric alcohol based on a total weight of the lean sorbent.

7. The method of claim 1, wherein the polyhydric alcohol comprises at least one of sorbitol, erythritol, pentaerythritol, ribitol, or xylitol.

8. The method of claim 1, wherein identifying a stream including producing at least a portion of the carbon dioxide from a subterranean formation.

9. The method of claim 1, wherein the stream includes at least one of hydrogen sulfide, hydrocarbons, nitrogen or helium.

* * * * *